(No Model.)

N. SWENSON, J. S. LINDQUIST & C. HEDLUND.
Plow.

No. 237,631.  Patented Feb. 8, 1881.

Witnesses
Fred. G. Dieterich
Geo. A. Flaccus

Inventors
Nicholas Swenson
John S. Lindquist
Christian Hedlund.
by Louis Bagger & Co.
attys

UNITED STATES PATENT OFFICE.

NICHOLAS SWENSON, JOHN S. LINDQUIST, AND CHRISTIAN HEDLUND, OF SWEDEBURG, NEBRASKA.

PLOW.

SPECIFICATION forming part of Letters Patent No. 237,631, dated February 8, 1881.

Application filed September 3, 1880. (No model.)

*To all whom it may concern:*

Be it known that we, NICHOLAS SWENSON, JOHN S. LINDQUIST, and CHRISTIAN HEDLUND, of Swedeburg, in the county of Saunders and State of Nebraska, have invented certain new and useful Improvements in Plows; and we do hereby declare that the following is a full, clear, and exact description of the invention, which will enable others skilled in the art to which it appertains to make and use the same, reference being had to the accompanying drawings, which form a part of this specification, and in which—

Figure 1:
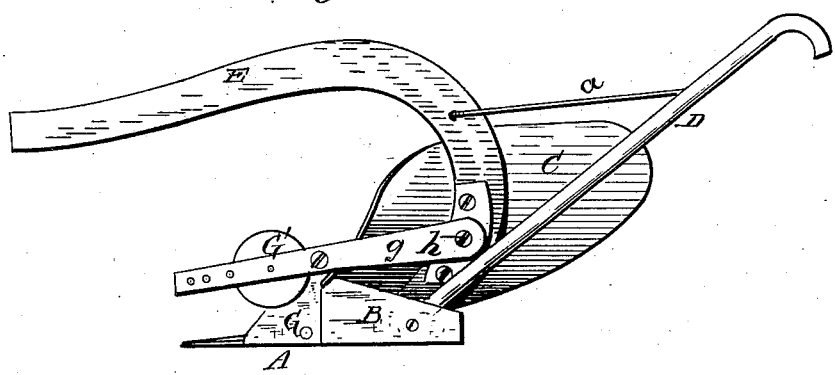
Figure 2:
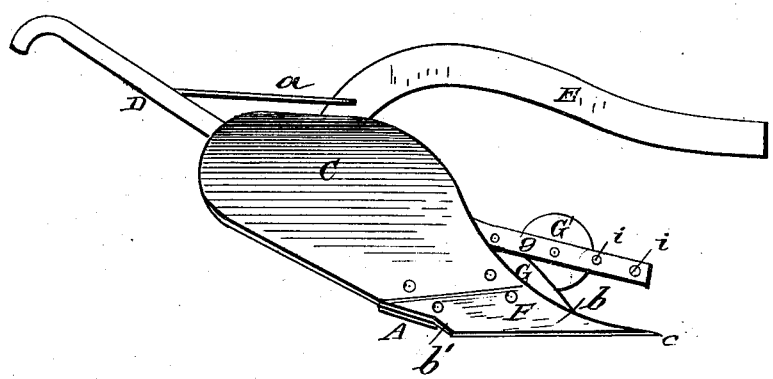
Figure 3:
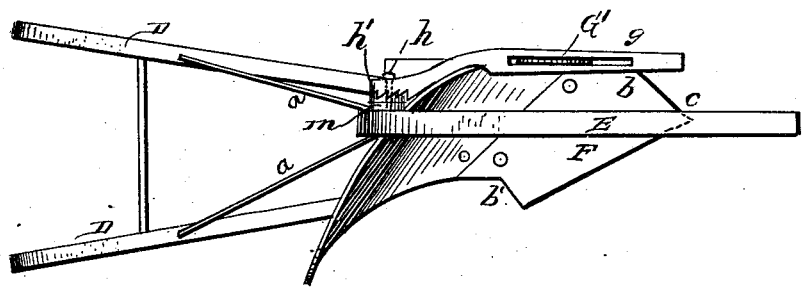

Figure 1 is a land-side view of our plow. Fig. 2 is a view of the opposite side of our plow, and Fig. 3 is a plan view of the same.

This invention appertains to improvements in plows, having for its object to prevent the tendency of the plow moving against the land side of the furrow, and to expose roots, &c., to the double-cutting action of a stationary and a rotary cutter; and it consists of a share with a short and a long sided taper, and its point arranged about on a line central with the width of the mold-board, forming a "toe-point," so called, and of a fixed cutter secured to the landside of the plow, combined with a rotary cutter hung in a beam, with its rear end carried behind the mold-board and fastened to the rear part of the plow-beam, substantially as hereinafter more fully set forth.

In the accompanying drawings, A refers to the base, with the landside B formed or attached thereto.

C is the mold-board, also fastened to the base or bottom A, and of the usual construction.

D D are the handles, fastened, as is common, to the mold-board and landside.

E is the plow-beam, of the ordinary curved form, and secured to the base A and connected by braces *a a* to the handles D D.

F is the share, obliquely fitted to the mold-board, and having a long and a short sided taper, *b b'*, with its point *c* arranged in about a plane central with the width of the mold-board, as seen in Fig. 3, the object of which is to effect the penetration of the ground at a point a greater or less distance inwardly from the landside, and about in a vertical plane with the plow or draft beam, to keep the point about in the center of the furrow, and, in addition to equalizing the pressure on the beam or draft-bar, preventing the tendency of the plow to move laterally toward the land side of the furrow, as experienced in the use of the common plow, thereby causing the plow to run more easily and freely in the ground. This forms what is termed a "toe-point."

Affixed to the forward side of the landside B is a fixed or stationary cutter, G, while above, and resting at or near its edge, is a rotary cutter, G', which is hung in a slotted bar or beam, *g*, carried around behind the mold-board and fastened to the rear lower end of the plow-beam, the purpose of which is to bring the resistance of the roots, &c., as they are cut by the cutters, about centrally with the plow, or upon and in a line with the draft-beam, to prevent careening or tilting of the plow, as would occur with the said resistance or action of the knives or cutters exerted or brought entirely upon one side of the plow.

It will be observed that the adjustable slotted beam *g*, carrying the rotary cutter, has its fulcrum upon a bolt, *h*, which projects laterally from the lower end of the curved plow-beam. The pivoted end of beam *g* has a radially notched or serrated disk or rosette contiguous to a similar disk, *m*, which is secured rigidly upon the plow-beam, as clearly shown in Fig. 3, so that by loosening the bolt *h* the slotted bar *g* may be adjusted vertically in the arc of a circle, and fixed in its adjusted position simply by again tightening bolt *h*. The rotary cutter G' may further be adjusted, by means of the bolt-holes *i* in the slotted bar *g*, so as to regulate its position in respect of the plow-point *c* and stationary cutter G.

We are aware that fixed cutters or colters and revolving cutters having compound adjustment vertically and horizontally are not, broadly, new.

We are also aware of the patent to S. M. Cedarland, of August 29, 1876; but in that device the draft or beam and the landside are differently arranged, and many of the features of our invention are not embodied therein. In our device the point is situated near the center of the furrow, and the incline of the mold-board throws all the soil away from the landside, and in this operation the cutter G and revolving cutter G' serve efficiently upon the landside to separate the earth for the approach of the mold-board, and to sever roots, sod, and the like.

We do not claim, broadly, the combination, with the mold-board, share, and stationary colter or cutter of a plow, of an adjustable rotary cutter; but

What we claim as our improvement, and desire to secure by Letters Patent of the United States, is—

In a mold-board plow, the centrally-pointed share F, having the toe-point $c$ in the center of the furrow, the beam E, curved over the center of the plow, the rolling colter G' and arm $g$, curved outward from the standard, to act in conjunction with the fixed cutter G upon the landside, and having compound adjustability, all constructed and combined as and for the purposes set forth.

In testimony that we claim the foregoing as our own we have hereto affixed our signatures in presence of two witnesses.

NICHOLAS SWENSON.
JOHN S. LINDQUIST.
CHRISTIAN HEDLUND.

Witnesses:
OTTO F. STEEN,
WILLIAM JASPER RIDDLE.